United States Patent
Ashcraft et al.

(10) Patent No.: US 9,389,642 B2
(45) Date of Patent: Jul. 12, 2016

(54) DOCKING CONNECTOR

(71) Applicant: Hewlett-Packard Development Company, L.P., Houston, TX (US)

(72) Inventors: Britt C. Ashcraft, Houston, TX (US); Eric Chen, Houston, TX (US); Ki Bok Song, Houston, TX (US); Heesang Kil, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 425 days.

(21) Appl. No.: 13/872,758

(22) Filed: Apr. 29, 2013

(65) Prior Publication Data

US 2014/0321049 A1 Oct. 30, 2014

(51) Int. Cl.
*H05K 7/10* (2006.01)
*G06F 1/16* (2006.01)
*H01R 13/62* (2006.01)
*H01R 13/635* (2006.01)

(52) U.S. Cl.
CPC .......... *G06F 1/1632* (2013.01); *H01R 13/6205* (2013.01); *H01R 13/635* (2013.01); *Y10T 29/49117* (2015.01)

(58) Field of Classification Search
CPC ............ G06F 1/1632; H01R 13/6205

USPC ......................... 361/679.41–679.45
See application file for complete search history.

(56) References Cited

U.S. PATENT DOCUMENTS

| | | | |
|---|---|---|---|
| 5,187,645 A * | 2/1993 | Spalding | G06F 1/1615 312/223.2 |
| 5,931,683 A | 8/1999 | Pinel | |
| 7,311,526 B2 | 12/2007 | Rohrbach et al. | |
| 7,963,773 B2 | 6/2011 | Palli et al. | |
| 2012/0005495 A1 | 1/2012 | Matsuoka et al. | |
| 2013/0002193 A1* | 1/2013 | Aldana | G06F 1/1632 320/107 |
| 2014/0321040 A1* | 10/2014 | Rutter | G06F 1/1632 361/679.26 |

OTHER PUBLICATIONS

Roh, et al; "Flexible Docking Mechanism Using Combination of Magnetic Force with Error-compensation Capability", <http://ieeexplore.ieee.org/stamp/stamp.jsp?arnhumber=4626554> On pp. 697-702.

* cited by examiner

*Primary Examiner* — Ramon M Barrera
(74) *Attorney, Agent, or Firm* — HP Inc Patent Department

(57) ABSTRACT

Examples provide mechanisms, methods, and systems for coupling a docking port of a computing device to a docking connector. In various examples, the docking connector includes a magnetic material to provide a mating force. The mating force may be utilized to extend the docking connector. Once extended, a release mechanism may be utilized to retract the docking connector.

16 Claims, 4 Drawing Sheets

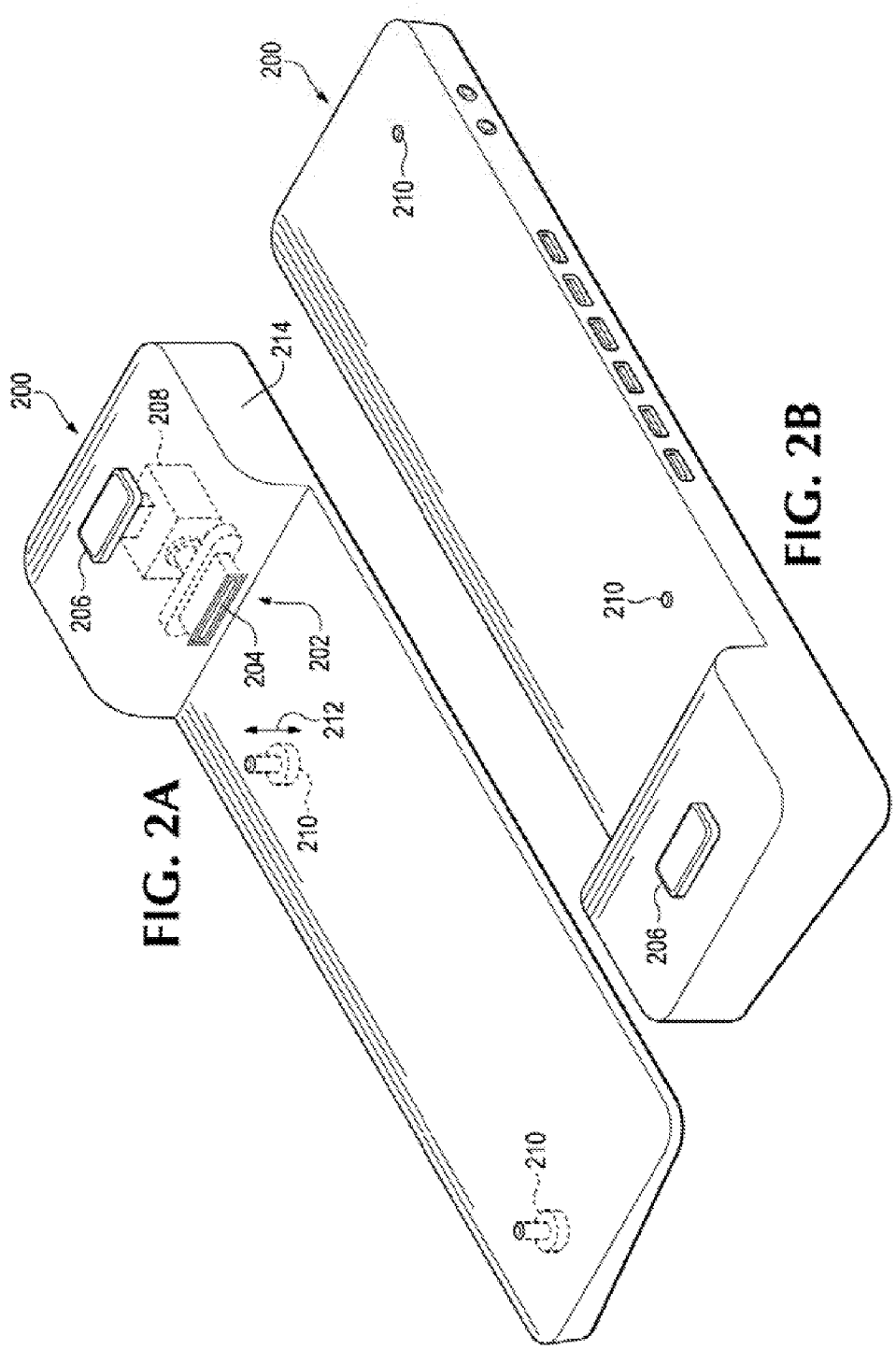

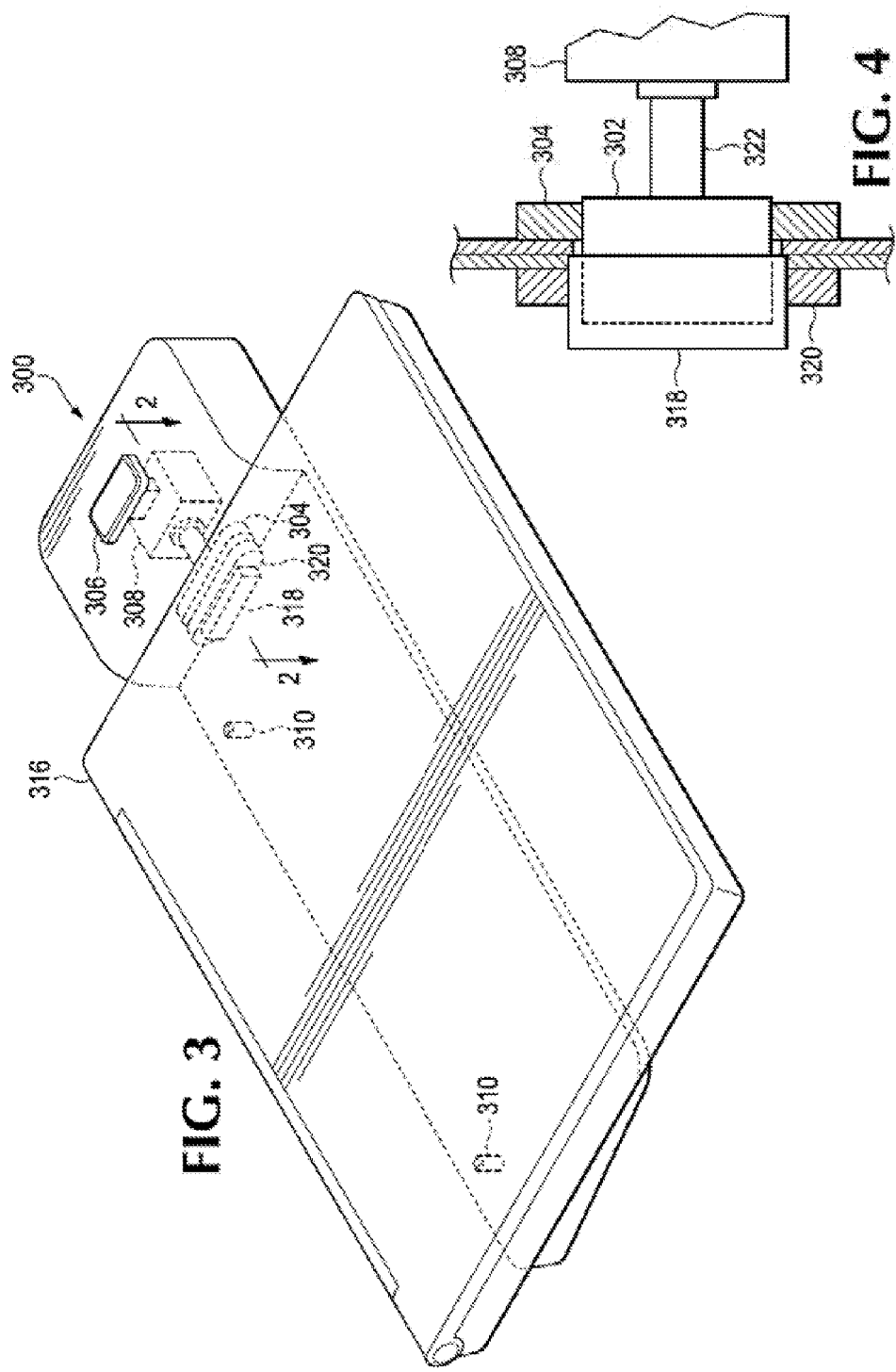

DOCKING CONNECTOR

BACKGROUND

Computing systems such as notebook computers are generally manufactured for portability. In various instances, however, it is desirable to utilize these computer systems with larger displays, keyboards, a mouse, speakers, or other devices which are external to the computing system. Consequently, computer systems are provided with various ports to enable interoperability with various peripheral components. In addition to the various ports, some computing systems may be configured with a docking connector to facilitate communication with multiple devices via a docking station. A docking station may provide a computing system access to multiple peripheral devices via one or more connectors.

BRIEF DESCRIPTION OF THE DRAWINGS

FIG. 2A-B illustrate another example apparatus comprising a docking connector and pins in accordance with an example of the present disclosure;

FIG. 3 illustrates an apparatus coupled to a computing system in accordance with an example of the present disclosure;

FIG. 4 illustrates a docking connector coupled to a docking port of the computing system of FIG. 3 in accordance with one example.

DETAILED DESCRIPTION

Computing devices such as notebook computers, mobile devices, and tablets, among others, are generally manufactured for portability. Consequently, components such as displays, keyboards, and mice are minimized relative to, for example, desktop computers. In various instances, however, it is desirable to utilize these portable computer systems with larger displays, keyboards, a mouse, and multiple other peripherals.

To enable use with additional peripherals with computing systems, the computing systems are often manufactured with external ports. These external ports, however, may necessitate the coupling and decoupling of multiple connectors for each use. To aggregate these connections for ease of use a docking station may be utilized. A docking station is a computing component which includes multiple ports for various peripherals including displays, keyboards, mice, and components to communicatively couple these ports to a computing system such as a notebook computer or tablet, in this manner, a computing system such as a notebook computer may be coupled to the docking station or "docked" and multiple static connections to a monitor, for example, may be provided.

Docking stations generally utilize mechanisms to secure the computing system to the docking station and communicatively couple the computing system to the various peripherals. These mechanisms may ensure that computing systems are not damaged by improper removal or inadvertent handling of the various components. The mechanisms make connections with the computing system via actuation of buttons and or slide latches. These mechanisms provide a poor user experience, additional cost, and may cause field failures.

In the instant disclosure, apparatus, systems, and methods are disclosed which enable a more fluid user experience in docking or coupling a computing system to a docking station. In the instant disclosure, an apparatus is provided with a magnetic docking connector which may respond to the presence of a docking port on a computing device. In various examples, a release mechanism may also be provided, which when actuated provides a retraction force to decouple the docking station from the computing device. The use of magnetic docking connectors and release mechanisms may automate the docking experience and remove a need for possible inconsistent manual actuation of various components which may possibly lead to damage.

Figure 1A:
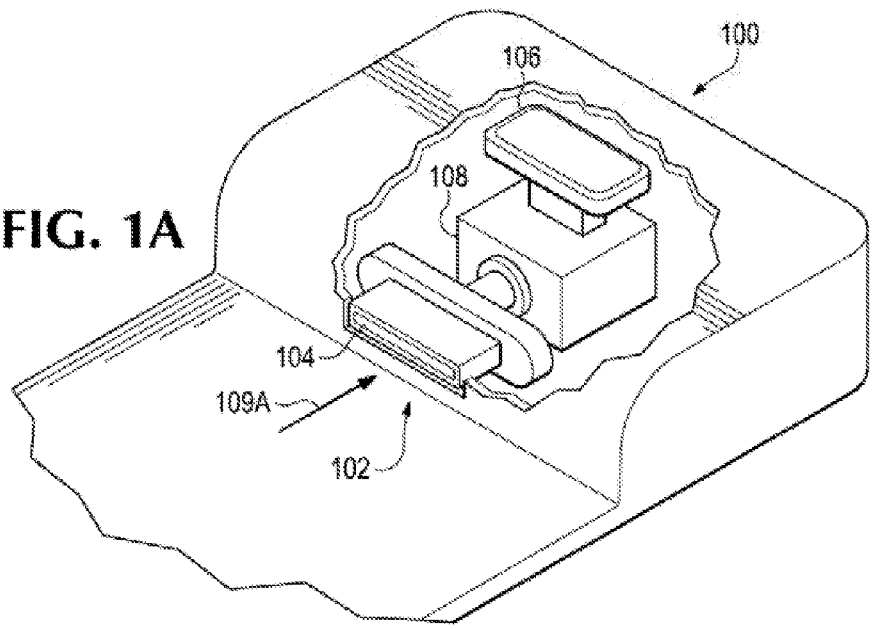
FIGS. 1A-B illustrate an apparatus comprising a docking connector in accordance with an example of the present disclosure.
Figure 1B:
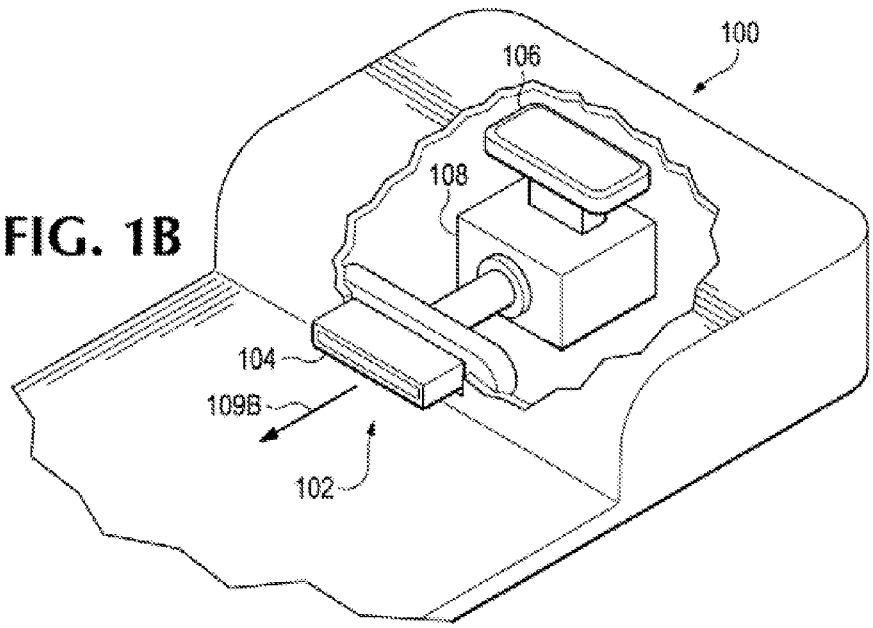

Referring to FIGS. 1A and 1B an apparatus is illustrated in accordance with an example of the present disclosure. The apparatus 100 is a docking station that is configured to couple a computing device, such as but not limited to, a notebook computer or a tablet to one or more peripheral devices. The apparatus 100 inducted a docking connector 102 and a release mechanism 108.

The docking connector 102 is to couple to a docking port of a computing device (not illustrated). The docking connector 102 comprises a magnetic material 104 that is to provide a mating force to move the docking connector 102 from a retracted position to an engaged position. The movement of the docking connector 102, in various examples, may be in response to a presence of a docking port of the computing device. The docking connector 102 may include multiple pins arranged in standard configurations or proprietary configurations. For example, the docking connector 102 may be a Portable Digital Media interface ("PDMI") which is an interconnection standard developed for portable media players.

The docking connector 102 may comprise a magnetic material 104 disposed around and/or adjacent to a connection interface. The magnetic material 104 may comprise permanent magnets which are generally made of ferromagnetic materials, temporary magnets which act as permanent magnets when they are subjected to or within a magnetic field, electromagnets which are produced by placing a metal core inside a coil of wire caring an electric current, and/or materials which may be attracted to magnets such as steel. Other magnets are contemplated. In various examples, the location and shape of the magnetic material 104 is configured to facilitate alignment of the docking connector 102 with the docking port of the computing device (not illustrated). The magnetic material 104 may be configured to interact with a corresponding magnet on the computing device, or alternatively, may be configured to interact with a material that is either attracted or repelled by a magnetic field.

The magnetic material 104 of the docking connector 102 may generate the mating force to move the docking connector 102 from the retracted position to an engaged position. The mating force in various examples may be a magnetic force that is generated between the magnetic material 104 of the docking connector 102 and the docking port of the computing device. In this manner, the docking station 100 may respond, without user interaction, to a presence of a computing, device and apply a generally consistent application force to the components involved will the coupling.

The docking station 100 may include a release mechanism 108 that is coupled to the docking connector 102. The release mechanism 108, when actuated, is to provide a retraction force that is greater than the mating force to move the docking connector 102 from the engaged position to the retracted position. In the illustrated example, the release mechanism is coupled to a button 108 which is to actuate the release mechanism 108. In various examples, the actuation force associated with actuating the release mechanism 108 may be independent of the retraction force. In other words, the actuation of the release mechanism 108 may trigger the release mechanism to generate the retraction force which may be greater than or less than the force utilized to actuate the release mechanism 108.

The release mechanism 108 in one example may be a solenoid configured to generate the retraction force. A solenoid in one example refers to an apparatus which produces a magnetic field in a volume of space when an electric current is provided. The solenoid, in other examples, may be any device which converts energy into linear motion. In various examples, the release mechanism generates a retraction force which is greater than the mating force generate by the magnetic material 104 of the docking connector 102. The retraction force may be applied to the docking connector 102 via cabling or other components utilized between the two components. The retraction force may be actuated for a period of time. The period of time may be predetermined to enable removal of the computing device from the docking station 100.

Referring to FIG. 1B, the docking connector 102 comprises a magnetic material 104 that provides a mating force 109B to move the docking connector 102 into an engaged position. In the engaged position, the docking connector extends out of a housing of the docking station 100. The docking connector 102 may be configured to protrude a predetermined amount based upon an intended position of the computing device (not illustrated) relative to the docking station, or alternatively, may protrude from the housing until brought into contact with the connector port of the computing device (not illustrated).

Referring to FIG. 1A, the docking connector 102 has been moved from the engaged position of FIG. 1B to a retracted position via actuation of a release mechanism 108. In the illustrated example, a user may actuate button 106 which actuates the release mechanism 108 to generate a retraction force 109A which overcomes the mating force 109B. In other words, the retraction force 109A, when present, is greater than the mating force 109B. The retraction force may move the connector 102 to a retracted position wherein the docking connector 102 is housed within the docking station 100.

Referring to FIGS. 2A and 2B another example apparatus is illustrated in accordance with the present disclosure. The apparatus 200 of FIGS. 2A and 2B include generally similar components to those of FIGS. 1A and 1B. More specifically, the apparatus 200 includes a docking connector 202 comprising a magnetic material 204, and a release mechanism 208 which may be actuated by a button or other user interface 206.

The docking connector 202 is to couple to a docking port of a computing device (not illustrated). The docking connector 202 may comprise a magnetic material 204 disposed in a manner that it moves the docking connector 202 when brought within a predetermined proximity to the docking port of the computing device. That is, the magnetic material may provide a mating force that is to move the docking connector 202 from a retracted position to an engaged position based on proximity of the computing device. The movement may, as illustrated in FIGS. 2A and 2B, be a lateral movement, or alternatively may be a vertical movement. Similar to the docking connector 102 of FIGS. 1A and 1B the docking connector 202 may include multiple pins for transmission and receipt of data and power, among other signals.

The magnetic material 204 may comprise permanent magnets comprising various ferromagnetic materials, temporary magnets, and/or electromagnets. The magnetic material 204 may be configured to interact with an opposing magnet disposed within the docking port of the computing device to facilitate alignment, or alternatively, may be configured to interact merely with the metal within the docking port. In various examples, the connector may additionally include electromagnetic shielding to prevent interference with various signals transmitted and received via the docking connector 202.

The magnetic material 204 of the docking connector 202 may generate a mating force to move the docking connector 202 from a retracted position in which the docking connector 292 is housed within housing 214 to an engaged position wherein the docking connector is moved outside of the apparatus 200 in order to mate with a docking port of a computing device. The mating force may be a force that is generated via magnetism, and may include alignment and mating force components.

The apparatus 200 may also include magnetic pins 210. Magnetic pins 210 may be configured to secure and or align a computing device with the apparatus 200 while the docking connector 202 is in an engaged position. The magnetic pins 210 may comprise magnetic materials similar to those discussed with reference to the magnetic materials of the docking connector 202. The magnetic pins 210 may be configured to actuate linearly as indicated by arrow 212. The magnetic pins 210 may be configured to interact with magnets or magnetically effected materials disposed on computing device. In various examples, the magnetic pins 210 may be disposed such that they provide the proper positioning of the computing device to enable the magnetic material 204 of the docking connector 202 to generate a mating force.

Similar to the docking connector 202, magnetic pins 210 may be actuated and released via release mechanism 208. The release mechanism 208 may generate a retraction force for the magnetic pins 210 that is greater than the mating force generated by the magnetic materials. Alternatively, in other examples the release mechanism 208 may generate a magnetic force to move the magnetic pins 210. The movement of the magnetic pins 210 may enable release of the computing device (not illustrated) while increasing aesthetics of the apparatus 200 by presenting a minimalist design as illustrated in FIG. 2B.

Referring to FIG. 3, a system is illustrated in accordance with various examples of the present disclosure. The system 300 includes a portable computer 316 comprising a docking port 318, which includes a magnetic material 320. Coupled to the portable computer 316 is a docking station, which comprises a docking connector 302 to connect to the docking port 318. The docking connector 302 includes a magnetic material 304 to move the docking connector to the extended position when the docking port 318 is within a predetermined distance of the docking connector 302 of the docking station.

As illustrated in FIG. 3, the portable computer 316 is mated with the docking station. The magnetic pins 310 of the docking station have engaged the portable computer 316 to provide stability and security while coupled to the docking station, and the docking connector 302 has engaged the docking port 318.

The docking station further comprises a release mechanism 308 which may be actuated via a button 306. The release mechanism 308 may move the docking connector from the extend position to a retracted position. In addition, the release mechanism 308 may further actuate the magnetic pins 310 to release the portable computer 316. In various examples, the release mechanism may be a solenoid configured to generate a magnetic force that is greater than the mating force. The magnetic force may temporarily overcome the mating force generated by the magnetic materials 304, 320 of the docking connector 302 and the portable computer 316, respectively.

Referring to FIG. 4, a sectional view of the docking connector 302 and docking port 318 of FIG. 3 is illustrated in accordance with various examples. The release mechanism 308 is illustrated as being coupled to the docking connector 302 via a coupler 322. The coupler 322 may be a flexible or rigid coupler. As illustrated, magnetic material 304 of docking connector 302 is attracted to magnetic material 320 of docking port 318. The magnetic materials 320, 304 may be disposed such that the magnetic poles of each material facilitate proper alignment of the docking connector 302 with the docking port 304. Upon actuation of the release mechanism 308, a magnetic force that is greater than the mating force may facilitate retraction and release of the docking connector 302 from the docking port 304. The magnetic force to retract the docking connector 302 may act upon the magnetic material 304, or alternatively, may act upon a material disposed within the release mechanism 308 that is coupled to the coupler 322.

Figure 5:
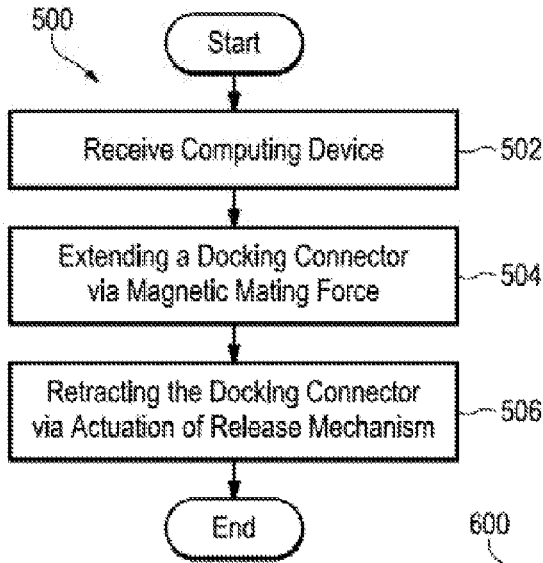
FIGS. 5-6 Illustrate flow diagrams in accordance with various examples of the present disclosure.
Figure 6:
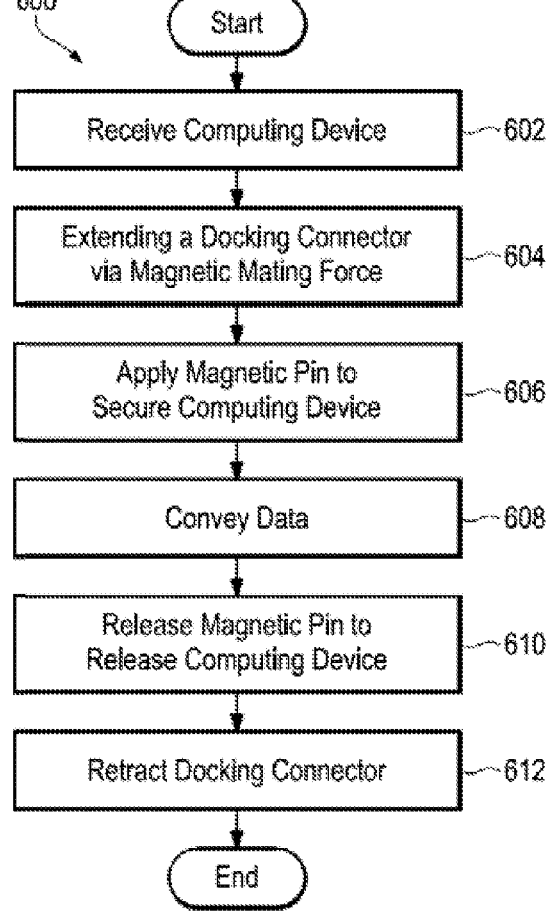

Referring now to FIGS. 5-6, flow diagrams will be illustrated in accordance with various examples of the present disclosure. The flow diagrams may illustrate elements associated with the apparatus and systems described in the preceding figures. While the elements may be illustrated in a particular order, the figures are not meant to imply that a particular order should be used in all examples, or that all elements are required for all examples. Rather, the figures are merely illustrated possible examples, and the scope of the invention remains defined by the claims.

Referring to FIG. 5, a flow diagram 500 may begin at 502 by receiving, by a docking station, a computing device comprising a docking port. The computing device may be a tablet computer, a notebook computer, a mobile device, a smart phone, or any other apparatus capable of communicating via a docking station. In response to receiving the computing device, the docking station, at 504, may extend a docking connector to couple to the docking port of the computing device. The extending, is based on a magnetic mating force between the docking connector and the docking port. Upon a need to de-couple the computing device from the docking station, at 506, the docking station may refract the docking connector from the docking port. The retracting may be in response to actuation of a release mechanism, which in various examples comprises the actuation of a binary button, wherein a binary button is described as a button capable of two positions independent positions. The method may then end.

Referring to FIG. 6, a more detailed flow diagram is illustrated in accordance with various examples. The method may begin at 602 by receiving a computing device comprising a docking port. The computing device may be a notebook computer, a tablet computer, a slate, a mobile phone, a smart phone, or any other device capable of coupling to a docking station. The receipt of the computing device by the docking station may comprise receiving the computing device in a sliding engagement along one or more guides or rails, or alternatively the computing device may be placed on the docking station.

Once received, the docking station may extent a docking connector to couple with a docking port of the portable computer. The docking connector may be extended via generation of a magnetic mating force at 504. The magnetic mating force may be generated by a magnetic material coupled to the docking connector which is attracted to the docking port or another magnetic material disposed proximal to the docking port Extending the docking connector may comprise moving the docking connector from a retracted position to an engaged position in response to the presence of the docking port.

In addition to extending the docking connector, the docking station may also apply one or more magnetic pins at 506. The magnetic pins may interface with the computing device to align, place, and secure the computing device to the docking station when the docking connector is in the extended position. The magnetic pins may include one or more hooks to secure the docking station with the computing device.

With the computing device effectively coupled to the docking station via the docking connector and the magnetic pins, data may be conveyed to and fern the computing device via the docking connector at 508. Data may include signals of various types and protocols. In addition, power may also be conveyed to the computing device via the docking connector. This conveying of data and power may enable the computing device to be utilized with various peripherals including, but not limited to, keyboards, monitors, a mouse, speakers, and others.

Upon a need to release the computing device from the docking station, the magnetic pins may release the computing device at 510. Release of the magnetic pins may be in response to actuation of the release mechanism. In various examples, the release mechanism may be a solenoid configured to generate magnetic forces which are greater than the mating forces generated by the docking connector and the magnetic pins.

Along with release of the magnetic pins, the release mechanism may also retract the docking connector. Retracting the docking connector may, in various examples, comprise lie moving the docking connector from the extended position to the retracted position wherein the docking connector is housed within the docking station in the retracted position. To retract the docking connector the release mechanism, which in various examples may be a solenoid, may generate a magnetic force that is greater than the magnetic mating force. The magnetic force may act upon the docking connector itself, or alternatively, may affect a component coupled to the docking connector such that the components movement directly affects movement of the docking connector.

In various examples win the docking connector in a retracted position, the computing device may be removed. Upon removal of the computing device, or alternatively, a predetermined amount of time, the release mechanism may stop generation of the force utilized to retract the docking connector. This may enable the docking connector to, once again, extend in the presence of the docking port when the computing device is placed proximal to the docking connector.

Although certain examples have been illustrated and described herein, it will be appreciated by those of ordinary skill in the art that a wide variety of alternate and/or equivalent examples or implementations calculated to achieve the same purposes may be substituted for the examples shown and described without departing from the scope of this disclosure. Those with skill in the art will readily appreciate that examples may be implemented in a wide variety of ways. This application is intended to cover any adaptations or variations of the examples discussed herein. Therefore, it is manifestly intended that examples be limited only by the claims and the equivalents thereof.

What is claimed is:
1. A method comprising:
receiving, by a docking station, a computing device comprising a docking port;
extending, by the docking station, a docking connector to couple to the docking port, wherein the extending is based on a magnetic mating force between the docking connector and the docking port; and retracting, by the docking station, the docking connector from the docking port in response to actuation of a release mechanism by generating a magnetic retracting force that is greater than the magnetic mating force.

2. The method of claim 1, further comprising:
applying, by the docking station, a magnetic pin to secure the computing device to the docking station.

3. The method of claim 2, further comprising:
releasing, by the docking station, the magnetic pin in response to actuation of the release mechanism.

4. The method of claim 1, wherein retracting the docking corrector from the docking port in response to actuation of the release mechanism comprises actuating a solenoid to generate a magnetic retracing force.

5. The method of claim 1, further comprising:
conveying, by the docking station, data to and from the computing device via the docking connector.

6. The method of claim 1, wherein retracting the docking connector from the docking port in response to actuation of the release mechanism comprises retracting the docking connector form the docking port in response to actuation of a button.

7. The method of claim 1, wherein retracting the docking connector from the docking port in response to actuation of the release mechanism comprises retracting the docking connector into a housing of the docking station.

8. The method of claim 1, wherein the release mechanism is a component of the docking station.

9. The method of claim 1, further comprising:
conveying, by the docking station, power to the computing device via the docking connector.

10. A system, comprising:
a portable computer comprising a docking port, wherein the docking port includes a magnetic material;
a docking station to couple to the portable computer, wherein the docking station comprises a docking connector to connect to the docking port in an extended position, wherein the docking connector comprises another magnetic material to move the docking connector to the extended position when the docking port is within a predetermined distance of the docking connecter of the docking station, and wherein the docking station comprises a release mechanism to move the docking connector from the extended position to a retracted position, wherein actuation of the release mechanism applies a magnetic force to the docking connector that is greater than a mating force coupling the docking connector to the docking port to release the docking connector from the docking port.

11. The system of claim 10, wherein the release mechanism is a solenoid.

12. The system of claim 10, wherein the docking station further comprises a magnetic pin to secure the portable computer to the docking station.

13. The system of claim 12, wherein the magnetic pin releases the portable computer upon actuation of the release mechanism.

14. The system of claim 10, wherein the release mechanism is a button.

15. The system of claim 10, wherein the docking station comprises a coupler and wherein the release mechanism is attached to the docking connector via a coupler.

16. The system of claim 10 wherein the magnetic poles of the magnetic material in the docking port and the magnetic poles of the magnetic material in the docking connector facilitate proper alignment of the docking connector to the docking port.

* * * * *